Dec. 25, 1928.

B. H. DIVINE 1,696,390

MACHINE FOR EXTRACTING JUICE FROM FRUIT

Filed April 30, 1926 4 Sheets-Sheet 1

Inventor
BRADFORD H. DIVINE

By Martin & Rendell
Attorneys

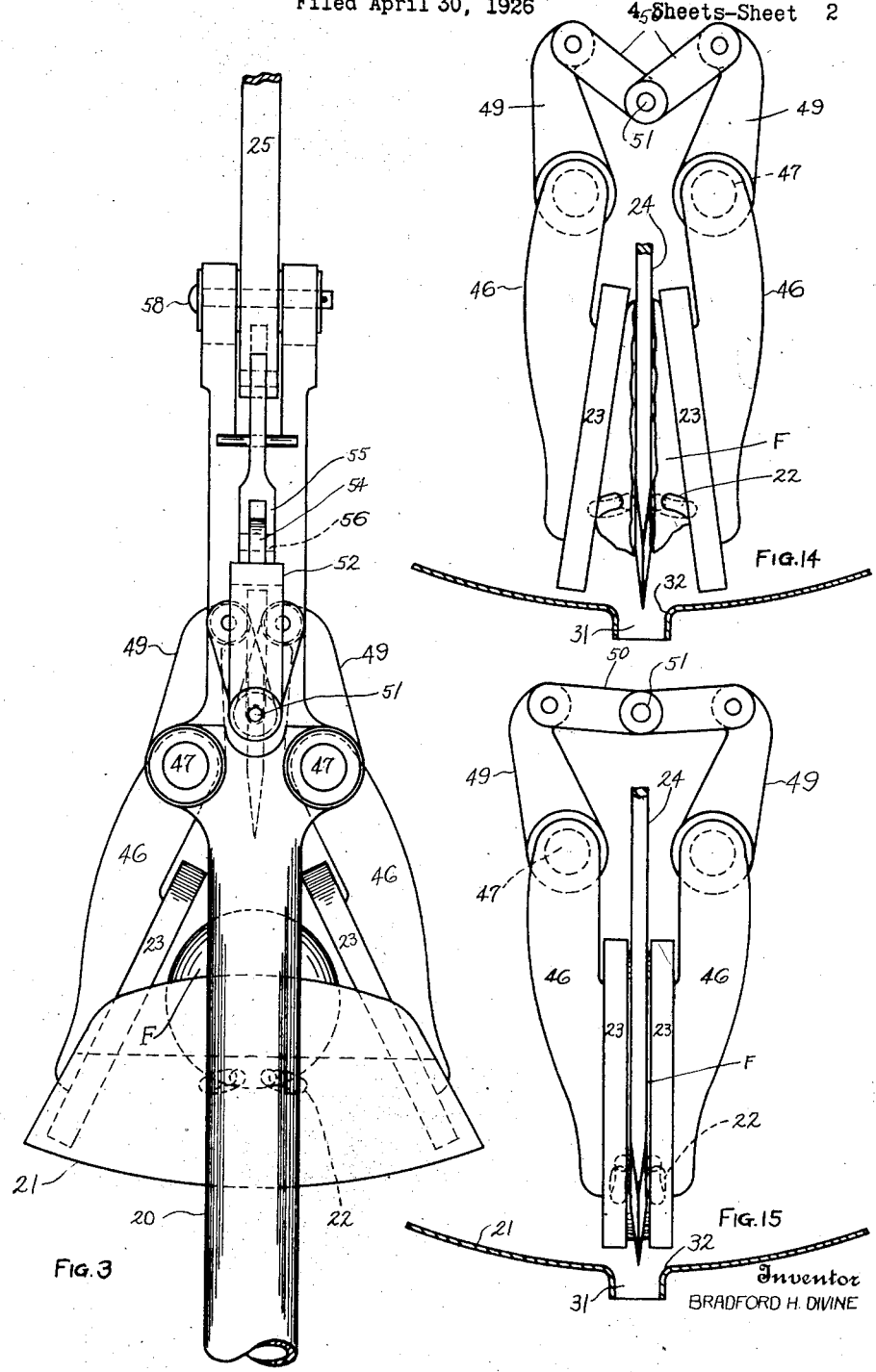

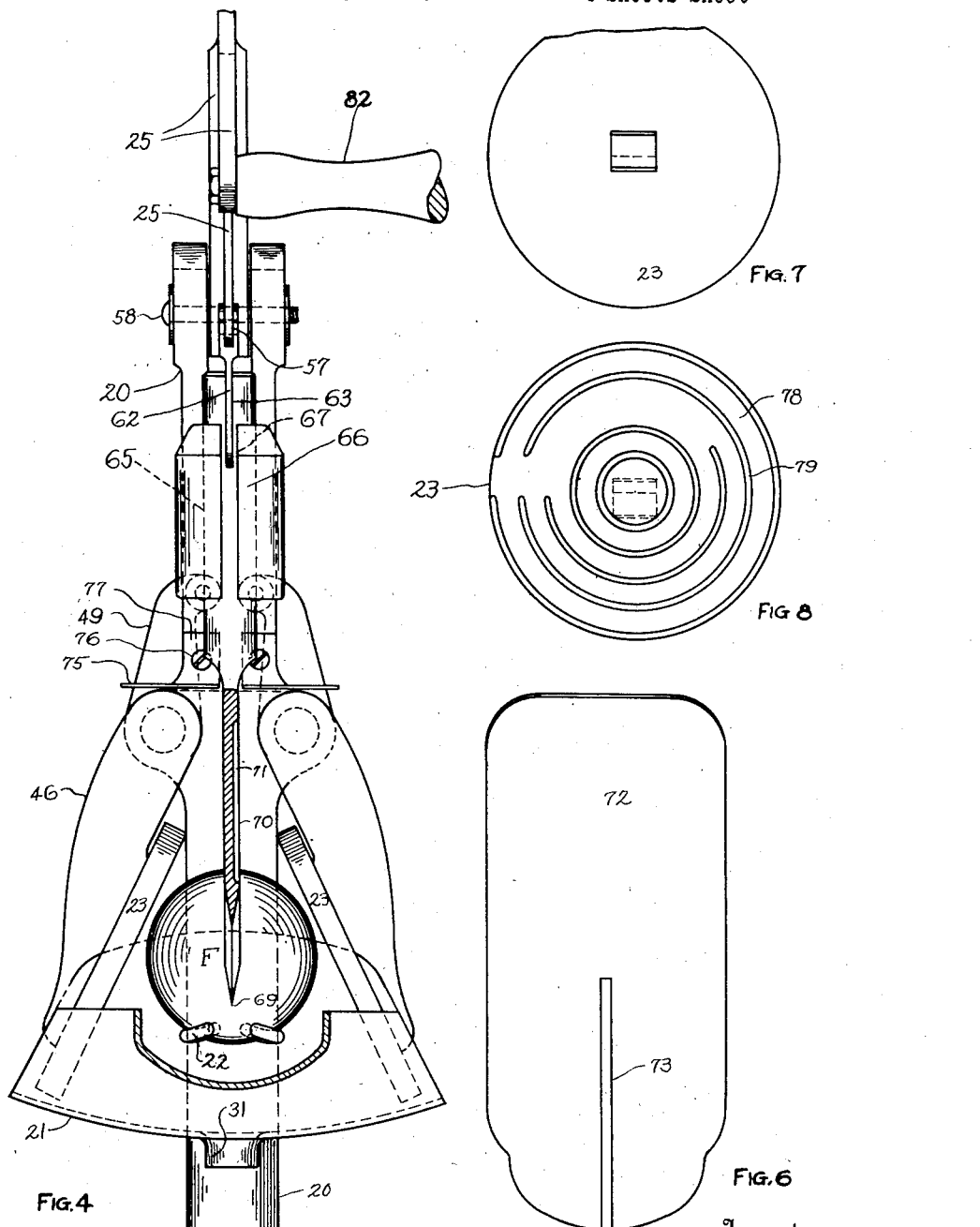

Dec. 25, 1928.
B. H. DIVINE
1,696,390
MACHINE FOR EXTRACTING JUICE FROM FRUIT
Filed April 30, 1926    4 Sheets-Sheet 4
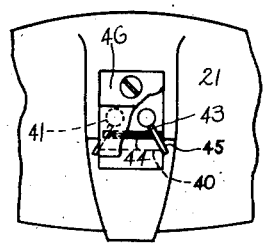
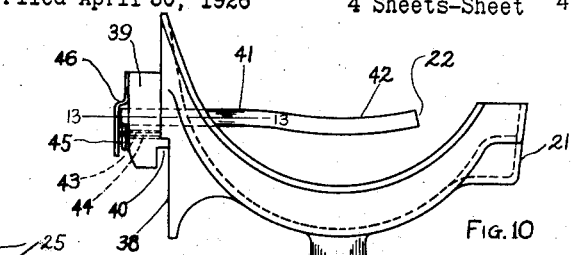
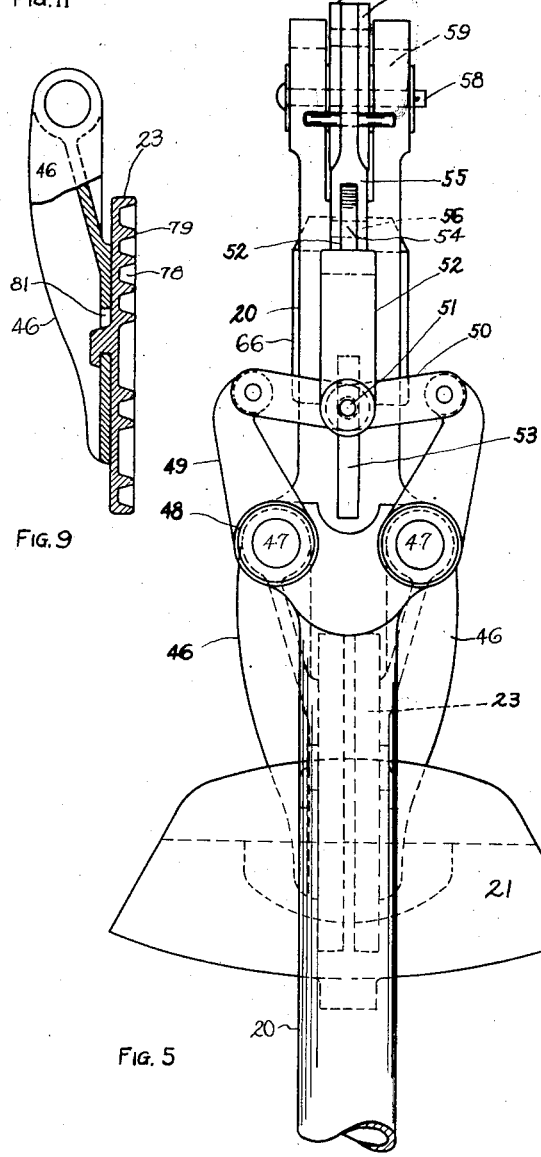
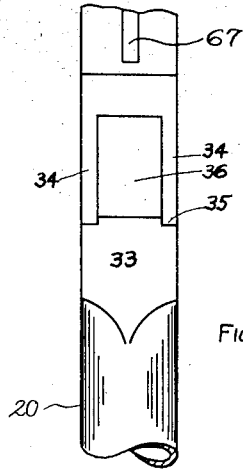
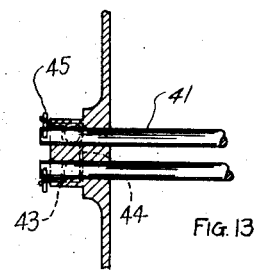
Inventor
BRADFORD H. DIVINE
By Martin & Rendell
Attorneys Patented Dec. 25, 1928.

1,696,390

UNITED STATES PATENT OFFICE.

BRADFORD H. DIVINE, OF UTICA, NEW YORK.

MACHINE FOR EXTRACTING JUICE FROM FRUIT.

Application filed April 30, 1926. Serial No. 105,854.

My present invention relates to a machine for removing the juice from fruit such as oranges, lemons and the like and particularly of the type where a whole fruit is put into the device and the operation of the machine cuts the fruit into halves or portions and then presses the juice out of the several portions of the fruit and this juice is collected and run into a tumbler or proper receptacle and a reversal of the mechanism of the machine allows the rind and pulp of the fruit to be readily removed leaving the machine ready for another operation.

The purpose of my invention is to provide a machine of the class described which is substantial and strong in construction, simple and easy to operate and adapted to efficiently extract the juice from fruit.

A further purpose is to provide a machine where the knife for cutting the fruit and the squeezing plates for pressing the juice from the cut portions of the fruit are so connected to a single operating lever that one complete movement of said lever causes the knife to descend through the fruit and then presses the squeezing plates towards each other against the fruit and a single reverse movement of said lever retracts said plates and knife to their initial position.

Further purposes of my invention are to provide a machine which is strictly sanitary in that the operating mechanism is simple so that it can be very readily cleaned and to have the parts that directly engage the fruit either entirely removable for cleaning or readily fully exposed for the same purpose.

Another aim of my invention is to provide mechanism particularly designed and adapted to provide the necessary power in the proper sequence for the different operations from the single stroke of the operating lever even when operated by a minimum of power.

Further purposes and advantages of my invention will appear from the specification and claims herein.

Fig. 3 is a rear elevation of the central portion of the machine with the parts in the position shown in Fig. 1.

Fig. 4 is a vertical sectional view on line 4—4 of Fig. 2.

Fig. 5 is a rear elevation of the central portion of the machine as the parts are seen when the operating lever is fully lowered.

Fig. 6 is a front view of the front shield.

Figs. 7 and 8 are outside and inside views respectively of one of the squeezing plates.

Fig. 9 is a detailed sectional view through the left hand squeezing plate and its adjacent supporting arm.

Fig. 10 is a left hand side view of the juice collecting bowl and attached fruit supporting fingers with said parts detached from the machine and Fig. 11 is a rear view thereof with a part of a small bracket broken away.

Fig. 12 is a front view of the portion of the standard which removably receives the bowl.

Fig. 13 is a horizontal sectional view on line 13—13 of Fig. 10.

Figs. 14 and 15 are front views of the squeezing plates and their supporting arms and connected toggle joint links in the position these parts occupy just before final depression of the operating lever and at final depression of the operating lever.

Figures 1, 2:
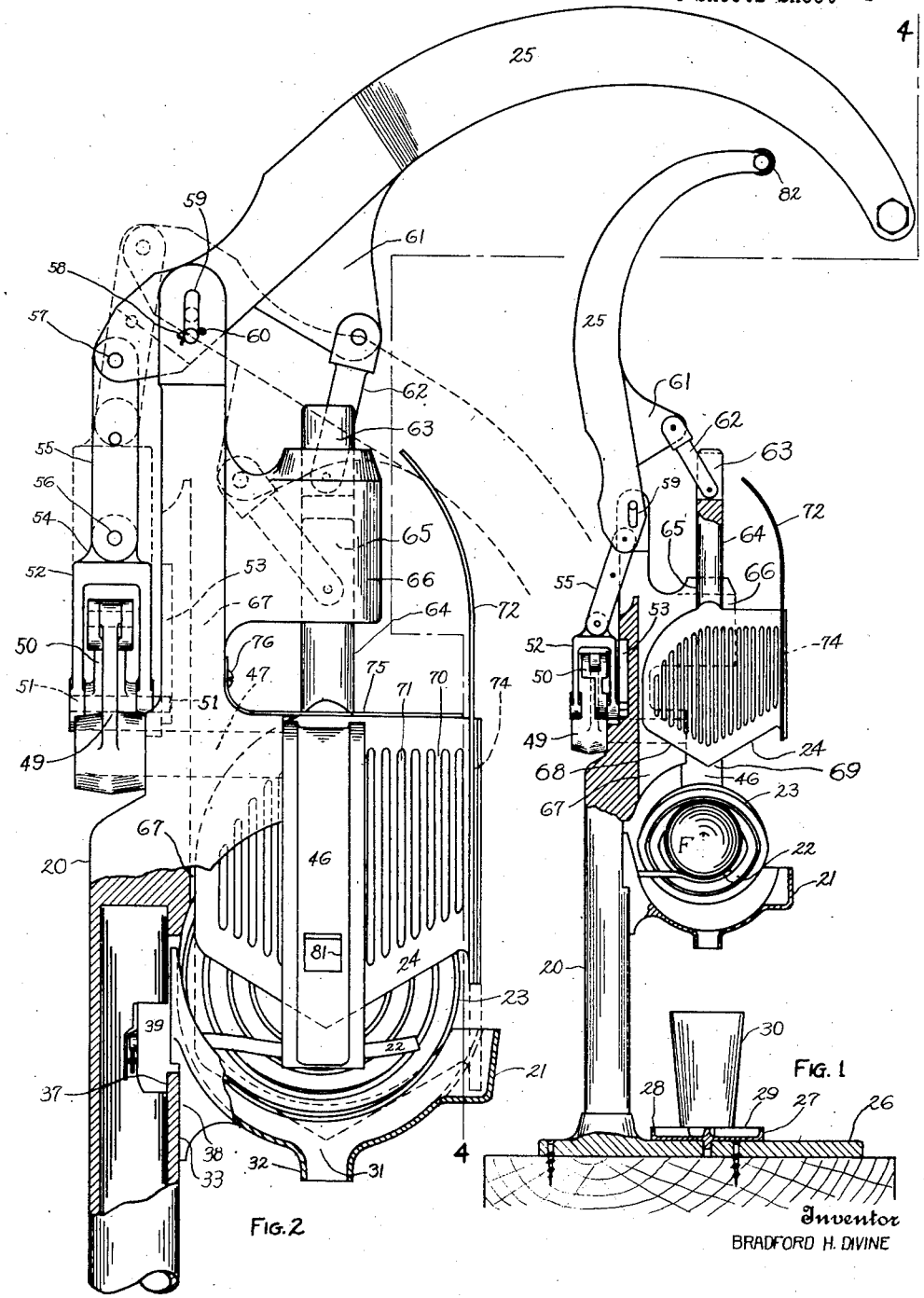
Fig. 1 is a view mostly in central vertical section of a complete machine embodying my invention as seen from the left hand side of the device.
Fig. 2 is a left hand side view of the same machine without the lower part of its standard and with the parts in intermediate position, the near squeezing plate being removed. This view and the remaining views of the drawings are on a larger scale than Fig. 1.

Referring to the drawings in a more particular description it will be seen that the machine comprises a standard 20, a juice collecting bowl or funnel 21, fruit supporting means 22, oppositely disposed swingingly mounted squeezing plates 23, a vertically sliding knife 24, a single operating lever 25 and means hereinafter more particularly described for connecting with the desired result and sequence of motion the said operating lever and the knife and squeezing plates.

The standard 20 preferably comprises a forwardly extending wide base 26 upon which is placed a removable drainage tray 27 formed as a disk with an upward circumferential flange 28 and upward radially arranged ribs 29 upon which the tumbler 30 may be rested during the operation of the machine. Any drops of fruit juice descending from the collecting bowl after the tumbler is removed and handed to the customer will be caught in this tray. As the tray may be readily removed and cleansed from time to time the dropping of fruit juice upon the base of the machine is practically avoided.

The fruit collecting bowl 21 is detachably supported upon the standard 20 in forwardly projecting position. The body of the bowl is circular in cross section in both directions; that is laterally it is formed with a curve substantially coinciding with the swing of the lower end of the squeezing plates 23 as seen particularly in Fig. 4 while from front to rear said bowl is curved to closely approach the circle of the said squeezing plates as appears from Figs. 1 and 2. At the middle and lower portion of the bowl an outlet hole 31 is provided to allow the collected juice to flow down into the tumbler 30 placed therebelow. Preferably the bowl extends downward around this hole forming a downwardly projecting spout 32 in order to more surely direct the fruit juice into the tumbler.

Opposite the bowl 21 the standard 20 is provided at its forward side with a flat face 33 and thereabove with two oppositely disposed flat faces 34 connected by an upwardly facing shoulder 35. Between the faces 34 the standard is cut away forming an opening 36 extending into the hollow standard and at the rear of the flat face 33 immediately below its upper edge is provided a vertical parallel bearing surface 37. At the rear side of the fruit collecting bowl 21 there is provided a flat vertical face 38 which will bear against the face 33 on the base. Upon the rear side of the bowl also is provided a rearwardly extending block 39 adapted to project into the opening 36 of the standard and thereby maintain the bowl from rocking. Between the lower end of this block and the rearwardly exposed face 38 upon the bowl is a notch 40 the forward face of which engages the inner side 37 upon the standard immediately below the opening 36 and in an obvious manner removably locks the bowl in place when the bowl is shoved down. The depth of this notch co-operating with part 33 of the standard and the shoulders 35 on the standard meeting a corresponding downwardly facing shoulder upon the bowl form stops limiting the downward movement of the bowl. Substantially horizontally mounted in the bowl are provided two fruit-supporting arms 41. The forward ends of these arms are provided with curved portions 42 with the said curved portions normally extending downwardly and away from each other so as to form holders to receive the fruit F such as an orange or lemon placed in the device. In order that these extended curved parts will not arrest the movement of the squeezing plates towards each other during the latter part of the squeezing operation these arms 41 are yieldingly and rotatably mounted in the rear portion of the bowl. The curved portions 42 are normally held in extended position by means of a U-shaped spring 43 housed in a small pocket 44 provided in the rear side of block 39 with the projecting ends of said spring engaging small pins 45 projecting downward from the rearwardly extended ends of the arms 41. A bracket 46 attached at its upper end to the block 39 and having its lower end offset past the ends of the post and the projecting ends of the spring forms a guard for these parts and also serves to limit inward longitudinal movement of the arms relative to the bowl. The pins 45 prevent the arms from moving longitudinally forward. It will now be obvious that when the squeezing plates 23 are completing the squeezing operation the outwardly curved ends of the arms will be swung towards each other and downwardly but will spring outward again to support the rind and pulp of the fruit after the machine has completed its operation and the reverse movement of the lever has removed the squeezing plates and the knife from the portions of the fruit.

Each squeezing plate 23 is detachably mounted upon the lower and inner side of an arm 46 which arm is fixed upon the forward end of a short shaft 47 as by said arm being formed integral with said shaft or securely fastened thereto. The two shafts are revolubly mounted in suitable bearings 48 provided in the standard 20 on opposite sides of the center of the machine with said shafts extending rearwardly of the machine and there provided with crank levers 49 pinned or otherwise fastened to the rearwardly projecting ends of the shafts. These crank levers 49 extend upwardly and each arm has at its upper end pivotally secured thereto a link 50. These links project towards each other and are pivotally mounted upon a common pivoting pin 51 mounted in the lower ends of an inverted U-shaped link 52. The pin 51 projects forwardly from this link 52 into a slot 53 provided in and extending vertically of the rear face of the standard 20 in order to prevent any side swing of said link 52 and in order to insure an equal movement of said crank levers 49 and arms 46 carrying the squeezer plates.

At the upper end of the U-shaped link 52 there is provided an upwardly extending ear 54 which is straddled by and pivotally connected to the forked lower end of link 55 by pin 56. This link 55 extends upwardly at the rear of the standard 20 and has its upper end in turn connected by pin 57 to the rearward end of the operating lever 25.

The upper end of the standard 20 is forked and receives between its parts the said operating lever a short distance forwardly from the rear end of said lever. In the part of the lever so enclosed is securely mounted a strong pin 58 adapted to slide and rotate in vertically arranged elongated slots 59 provided in the forked upper portions of the standard.

In order to allow of the ready removal of the operating lever and its attached knife from the rest of the machine as for cleaning, the pin 58 is made readily removable as by said pin having a head at one end and having its other end pierced by a cotter pin 60.

Forward of the upper end of the standard the operating lever 25 is provided with a thin extension 61 projecting forwardly of the lever when the lever is in raised position. To the outer part of this extension is pivotally attached a thin link 62 which extends downwardly and has the greater portion of its length riding in a slot 63 vertically arranged in the upper end of the upwardly extending shank 64 of the knife 24.

The shank 64 of knife 24 is slidingly mounted for vertical movement in suitably-shaped slideways 65 provided in two oppositely disposed brackets 66 forwardly projecting from the standard 20 and preferably formed integral therewith. These brackets and slideways are of considerable extent vertically and are located about midway of the part of the standard between the elongated slots 59 and the bearings 48 provided for shafts 47.

The space between the brackets 66 is of sufficient width to allow the lever extension 61 and link 62 carried thereby to travel between the brackets as the operating lever is moved to downward position, such position being shown in dotted lines in Fig. 2. In alignment with the space between the two brackets 66 the forward central part of the standard 20 is cut away from a point opposite the top of said brackets to a point below the enlargements carrying the bearings 48 forming a vertical forwardly opening slot 67 to provide for the upward travel of the rear edge of the knife 24.

The knife 24 is formed as a thin spade-like member having its cutting edge at the bottom and preferably having this cutting edge formed in two portions or edges 68 arranged at an angle meeting at a point 69 at about the center of the knife with the two edges 68 extending upwardly at an angle to each other. The blade is of greater width than the fruit to be operated upon by the machine. The height of the blade is also greater than the diameter of the fruit to be cut so that after the cutting edge of the knife extends entirely through the fruit the blade of the knife will still be between the two portions of the fruit. Preferably each face of the blade will be provided with alternate vertically arranged ridges 70 and grooves 71 with said grooves extending almost to the cutting edges of the knife in order to aid in letting the juice run down along the two faces of the blade when the knife has descended and the two portions of the fruit are pressed against the blade.

A front shield or guard 72, of which a front elevation is shown in Fig. 6, is mounted upon the forward edge of the knife 24 in order to descend with the knife during the cutting and squeezing operation and so prevents any juice being thrown forward upon the operator. Preferably this shield will be detachably mounted upon the knife as by said shield having a slot 73 provided midway of its width and extending from its lower edge about half way up through said shield. This slot fits vertical grooves 74 provided in the knife adjacent its forward edge. As shown in the drawings this shield in the downward position of the knife enters the forward side of the juice collecting bowl so that any juice forced towards said blade runs down into the bowl. Preferably the shield extends well above the upper edge of the knife and towards its upper end is curved towards the body of the machine. This upper part of the shield prevents any juice from being thrown out above the knife against the operator or against the operating lever.

Immediately above the upper end of each arm 46 there is provided a horizontally arranged guard 75 secured to the standard 20 as by screw 76 extending through an upwardly projecting ear 77 provided on the rear side of said guard. These guards extend as close as practicable to the opposite faces of the knife and serve to clear any pulp from the knife as it moves upward and also serve to prevent any upward spattering of juice from the fruit.

Preferably the inner face of each squeezing plate 23 is provided with grooves 78 and ridges 79 which preferably will be concentrically arranged. These ridges grasp the fruit more firmly and aid in the extraction of the juice from within the fruit. As shown in Fig. 8 the ridges are cut away at the rear of each plate and for a distance through the central part of the blade towards its lower side thus allowing space for the fruit-supporting arms 41 which come to be located between the outside of the fruit and the inner face of the presser plates.

Each squeezer plate is provided on its outer face with a downwardly projecting L-shaped hook adapted to be inserted through a hole 81 provided in the blade-supporting arm 46 and then slid downward in an obvious manner so as to allow the said squeezer plates to be readily removed from or attached to said arms.

The operation of the machine will be as follows: Assuming that the machine has its operating lever 20 in fully raised position as shown in Fig. 1 and accordingly with the knife raised to its upper position and with the squeezing plates extended to their outer position as suggested in Fig. 3, the orange or other fruit will be placed within the machine upon the fruit-supporting arms 41 and a tumbler 30 will be placed below the fruit-collecting bowl 21. Then the operator grasps the handle 82 projecting laterally from the upper end of the operating lever 25 and pulls downward upon said handle. During the first part of the downward movement of said lever the pin 58 on the lever will ride downwardly through the complete length of the elongated slots 59 at the top of the upright 20 with the fulcrum of the lever at pin 57 which will be held for the time being from upward movement due to the greater resistance of link 55 and the various parts immediately therebelow forming the toggle joint consisting of crank arms 49 and 50. Accordingly during the first part of this motion the squeezing plates will not be started inward but the knife will be forced downwardly into and almost through the fruit with the knife and connected parts then being in the position shown in Figs. 2 and 4. From this point continued downward movement of the handle swings the lever 25 about pin 58 as a fulcrum (since said pin has reached the bottom of the slots 59) so that the knife continues to be forced downwardly until its cutting edge is completely through the fruit as shown in Fig. 14 and so that the rear end of the lever is now moving upwardly and carrying therewith the links 55 and 52. This upward movement of link 52 in an obvious manner carries upwardly the inner connected ends of toggle joint links 53 and thereby forces outwardly the crank arms 49 projecting upward from shafts 47 and causes an inward swinging movement of the arms 46 depending from the forward ends of said shafts and so swings the squeezing plates 23 towards each other against the fruit bringing the said plates to approximately the position shown in Fig. 14. From this position of the parts still further continued downward movement of the handle to the final position thereof shown in dotted lines in Fig. 2 swings the lever on its pivoting pin 58 and gives with very great pressure the final squeezing movement to the plates 23 bringing them to the position shown in Fig. 15. The great force developed at this part of the movement is incident to the final straightening out of the toggle joint links as will appear from a comparison of Figs. 14 and 15. This last part of the movement of the lever, however, has very little or no appreciable effect upon the position of the knife as during this portion of the lever's movement the thin extension 61 is swinging sharply inward and so imparting through link 62 almost no movement to the knife attached thereto.

It will now be seen that the single downward movement of the handle has operated the knife and squeezing plates with the proper sequence of movement to first cut the fruit and then squeeze it with gradually increasing pressure until all the juice is extracted therefrom.

Similarly a single upward movement of the handle moves the operating parts to most easily remove the knife from the fruit and wipe off the knife with the skin of the fruit and then withdraw the squeezing plates from the fruit leaving the rind of the fruit with its substantially dry pulp and the seeds therewithin upon the fruit-supporting arms 41. The first part of the upward movement of the handle moves the squeezing plates slightly apart to approximately the position shown in Fig. 14 so that the knife may be more readily raised from between the portions of the fruit. The next portion of the upward travel of the handle raises the knife almost to its upward position but does not swing the plates outwardly much. This results from the fact that during this movement of the lever the pin 58 is traveling upward the length of the slots 59 so that the rear end of the lever is not being moved downwardly. The last part of the upward movement of the handle however does move the rear end of lever 25 downwardly and so swings the plates 23 out from the fruit and also completes the upward movement of the knife.

What I claim as new and desire to secure by Letters Patent is:

1. In a machine for extracting juice from fruit the combination of a standard, a fruit support, a knife slidingly mounted above said support for movement in a straight line towards and from said support and adapted to descend through said fruit, squeezing plates movably mounted at the opposite sides of said support and adapted to be brought towards each other against the fruit and an operating lever mounted upon said standard and operatively connected to said knife and said squeezing plates whereby a single operating stroke of the lever moves the knife downward through the fruit and presses the plates against the fruit.

2. In a machine for extracting juice from fruit the combination of a standard, a fruit support, a knife slidingly mounted above said support for movement in a straight line towards and from said support and adapted to descend through said fruit, squeezing plates movably mounted at the opposite sides of said support and adapted to be brought towards each other against the fruit, an operating lever mounted upon said standard and operatively connected to said knife and said squeezing plates whereby a single operating stroke of the lever moves the knife downward through the fruit and presses the plates against the fruit and a single return stroke of said lever withdraws the plates and raises the knife.

3. In a machine for extracting juice from fruit, the combination of a standard, a fruit support, a knife slidingly mounted above said support for movement in a straight line towards and from said support and adapted to descend through said fruit squeezing plates movably mounted at the opposite sides of said support and adapted to be brought towards each other against the fruit and an operating lever mounted upon said standard and operatively connected to said knife and said squeezing plates whereby a single operating stroke of the lever first moves the knife downward substantially through the fruit and then presses the plates against the fruit.

In witness whereof I have affixed my signature, this 22nd day of December, 1925.

BRADFORD H. DIVINE.